(12) United States Patent
Chang

(10) Patent No.: US 6,685,825 B1
(45) Date of Patent: Feb. 3, 2004

(54) WATER TREATMENT SYSTEM COMBINING OZONE INJECTION AND MONITORING APPARATUSES

(75) Inventor: Steven Chang, Hsin-Chu (TW)

(73) Assignee: Senno Technology Inc., Hsinchu (TW)

( * ) Notice: Subject to any disclaimer, the term of this patent is extended or adjusted under 35 U.S.C. 154(b) by 0 days.

(21) Appl. No.: 10/373,841

(22) Filed: Feb. 27, 2003

(30) Foreign Application Priority Data

Nov. 14, 2002 (TW) ........................................ 91133459 A

(51) Int. Cl.[7] .................. B01D 35/143; C02F 1/78; C02F 1/32
(52) U.S. Cl. .................. 210/87; 210/90; 210/136; 210/192; 210/259; 422/186.12
(58) Field of Search ........................ 422/186.12; 210/87, 210/90, 97, 136, 143, 192, 259, 760, 741

(56) References Cited

U.S. PATENT DOCUMENTS 5,089,144 A * 2/1992 Ozkahyaoglu et al. ...... 210/767
5,474,748 A * 12/1995 Szabo ................... 422/186.04
5,625,915 A * 5/1997 Radler et al. ................... 8/158
6,132,629 A * 10/2000 Boley ......................... 210/760
2003/0080068 A1 * 5/2003 Koslow et al. ............. 210/748

* cited by examiner

Primary Examiner—Terry K. Cecil
(74) Attorney, Agent, or Firm—Troxell Law Office PLLC

(57) ABSTRACT

A system for treating water includes an ozone injector combined with a monitoring apparatus 400 that includes a flow meter 402 and a pressure sensor 404. The monitoring apparatus includes a flow path 424 having inlets 420, 422 communicating with the inlet 304 and outlet 306 of the ozone injector main water pipe 302. The flow path inlets are spaced respectively upstream and downstream of the ozone injection point. In operation, water filtered in filter 108 is ozonized in venturi 316 and then sterilized by UV lamp 210. The lamp is also used to generate ozone that is delivered to the venturi via check valve 308. The pressure sensor positioned within the flow path produces signals to control the switch of the UV lamp. The flow meter is used to determine when the filter should be replaced. The pressure sensor may be in the form of a silicon chip.

10 Claims, 7 Drawing Sheets

WATER TREATMENT SYSTEM COMBINING OZONE INJECTION AND MONITORING APPARATUSES

BACKGROUND OF THE INVENTION

1. Field of the Invention

The invention relates to a water treatment system, and more particularly, to a water treatment system that combines disinfection gas injection components and flow meter, and that has monitoring functions to precisely monitor the service life of the filter material and to control the ultraviolet lamp.

2. Description of the Prior Art

Water is an indispensable basic element in our daily life, and drinking water is the most important thing that affects human health. With the rapid development in the industry, contamination of water resources caused by environmental pollution is becoming more and more serious day by day. Although tap water, the main source of today's drinking water, is filtered and sterilized by the water treatment plant, but it is still not able to satisfy people's need for clean drinking water. Buying water treatment apparatuses for a second-time water treatment or simply buying bottled mineral water in order to obtain drinking water which is clean and not harmful to man's health has been a measure to meet the above-mentioned demand. Aside from attaining the object of acquiring clean drinking water, the quality of the treated water, the service life of the water treatment apparatus, the convenience of use and maintenance, as well as the cost of water treatment are all important factors that the user should consider.

In respect of the water purifying process, what we need is the filtering of particles and antimicrobial action. The most popular methods of water treatment apparatus in the prior art are ozone and ultraviolet lamp with ionizing radiation. These two agents are used to sterilize or purify the water suitable for people to drink and to purify various effluents of industrial manufacturing process. In addition, they are also used in washing machines, the recirculating water in swimming pools, and in hot tubs. Conventionally, most of the water treatment apparatuses make use of the ultraviolet lamp irradiating to the contaminated water, or let an air stream to be exposed to the radiation from the ultraviolet lamp, thereby creating ozone from the oxygen contained in the air. The ozonated air is then mixed with the contaminated water that is to be purified.

Ozone is mainly generated either by high voltage discharge or by the irradiation with ultraviolet lamp. As for the irradiation with ultraviolet lamp, all the ultraviolet lights generated by the ultraviolet lamp contain wavelength of both 254 nano meters and 185 nano meters. The principle that the ultraviolet light having wavelength of around 185 nano meters and being the main light that generates ozone can be used to disinfect the bacteria in the water.

In respect of the use of ozone, due to the active nature of ozone and the demand amount for its use, it is necessary to generate ozone at or near a reaction chamber so that ozone and the contaminated water can be mixed together. As such, how to provide a simple, low cost, and compact apparatus to generate a relatively big volume of ozone is our goal.

In respect of the cost of water treatment apparatus, our main consideration is the need for periodic replacement of consumption products such as the active carbon filters and "Disinfecting filters" made of the polypropylene. Besides, there is a need for changing old ultraviolet lamps which have weaken strength of filtering quality in order to maintain the quality of the purified water.

In respect of the maintenance and convenience for use of water treatment apparatuses, the service life of the filters used in water treatment apparatuses is based on observation or the past experience of the suppliers in usage, maintenance personnel, or users who periodically change and replace the filters. As for the ultraviolet lamp, most of the conventional water treatment apparatuses, such as fountain machine, the ultraviolet lamp is turned on 24-hours a day whether or not there is anyone using it, thereby, its service life is very limited. As such, if a flow meter can be installed in the water treatment apparatus to measure the total water flow and usage volume, then the data can be used for predicting service life of the filter. In addition, if the ultraviolet lamp can be turned on only when it is in service, then turned off when not in use, its service life would be extended tremendously. Moreover, the water treatment apparatuses commonly seen today use a preset period of time to decide the service life and when to replace the filters. Since the total amount of time in the service life could end at late hours at night ,the noise of the apparatus will disturb people. Currently, there are no alarm sounding devices installed in water treatment apparatuses to remind the user to change and replace the filters.

In respect to the water treatment, related patents such as the U.S. Pat. No. 5,474,748 Szabo et al., U.S. Pat. No. 5,625,915 Radler, U.S. Pat. No. 6,132,629 Boley et al., etc. mention the use of Venturi tube as an apparatus for ozone gas injection. FIG. 6 is a partial diagram of the sterilizing system used in U.S. Pat. No. 5,474,748, Szabo et al.—"Water Disinfecting Device" of the prior art. FIG. 6 shows that the flow meter and ozone gas mixer are used separately. In the mean time, it also indicates the location and requirements of the flow meter. FIG. 7 is a block diagram of the main parts in Radler's U.S. Pat. No. 5,625,915, et al.—"Laundry Ozone Injection System". FIG. 7 shows that the flow meter and ozone gas mixer are also used separately. Meanwhile, it also indicates the location and requirements of the flow meter. The biggest drawback of these two related patents is the fact that the flow meter and ozone gas mixer cannot be combined together. Consequently, the user has to use relatively large installation space and high cost in order to attain the same object and function which makes the overall design of the facility even more complex. Furthermore, the reason why many water treatment facilities do not provide flow meters is not because there is no needs for it. Rather, it is due to the high cost of flow meters and the inability to directly apply those functions such as total water volume and the filter's remaining service life on the water treatment apparatus.

FIG. 5 is a schematic comparison drawing of the differential pressure type of flow meter of the prior art and the differential pressure type of flow meter of the invention. As shown in FIG. 5, Part A, the conventional differential pressure type of flow meters utilizes the pressure difference between the lowest pressure point at the narrow section 503 of the Venturi tube 316 and the water inlet 304 or water outlet 306. This design has a number of drawbacks: 1. If the point at the narrow section 503 is employed as the gas or fluid injection point, then this design is unable to combine the flow meter and the ozone gas injection apparatus together similar to that of the invention; 2. If the back pressure on the water outlet 306 is too large or the water flow is too slow, then the point at the narrow section 503 will become faulty in injecting gas, thereby affecting the measurement of the pressure difference; 3. In order to allow the flow meter to have a sufficient range of measurement for achieving a certain accuracy level, the diameter of the point at the narrow section 503 should be as small as possible. However, this will reduce the volume of water flowing out of the water treatment apparatus. Therefore, how to improve these drawbacks of conventional pressure difference type of flow meter is another target of our improvement to pursuit.

SUMMARY OF THE INVENTION

In light of the above-mentioned drawbacks of water treatment apparatuses of the prior art, the invention abandons the conventional flow meter that measures the pressure difference between the main water pipe 302 and the narrow section 503 of the Venturi tube, As shown in Part A of FIG. 5. Instead, As shown in Part B of FIG. 5, a specially designed flow meter is used to measure the pressure difference of the main water pipe's 302 narrow sections 501, 502 on both ends of the Venturi tube. As shown in FIG. 4, the narrow section 503 of the Venturi tube is used as an apparatus to inject fluids or gas. In the mean time, the pressure difference measured by this specially designed flow meter 402 is converted into flow rate and accumulated water flow. This design helps simplify the measuring of flow rate as well as the injection of fluids or gas. By using the water treatment apparatus of the invention, the user can reduce the waste of space needed for using the Venturi tube and flow meter to lower the cost. In addition, by employing the same principle of pressure difference to measure the flow rate and Venturi tubes to absorb ozone gas, the invention can avoid the system requiring two narrow sections for two Venturi tubes, which creates the trouble of reducing the water flow rate.

Therefore, in order to compensate the above-mentioned imperfection, of the prior art, one of the object of the invention is to provide a new type of flow meter for measuring the pressure difference at both ends of the Venturi tube.

It is another object of the invention to provide a water treatment system combining a monitoring apparatus having the above-mentioned new type of flow meter and an ozone gas injection apparatus.

It is a further object of the invention to provide various apparatuses in a water treatment system that combines ozone gas injection apparatus and monitoring apparatus. These apparatuses including a flow meter, a flow speed meter, and an ultraviolet lamp switch monitoring system derived from the flow speed meter can be used separately and independently.

It is still another object of the invention to provide a water treatment system combining ozone gas injection apparatus and monitoring apparatus in which a pressure sensor in the monitoring apparatus is made of a silicon chip. A side of the chip is in direct contact with the water from the main pipe, while the other side is covered with a layer of silicon gel after being connected to a wire bonding. The layer of silicon gel is then in direct contact with the fluid.

It is still a further object of the invention to provide a flow meter for measuring flow speed and total flow amount in order to calculate the service life of the filter. Based on this, the flow meter installs a buzzer that will give an alarm sound once the flow meter reaches its preset accumulated total amount of water flow, signaling that the filter has reached its expected service life and reminding the user to change a new filter.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
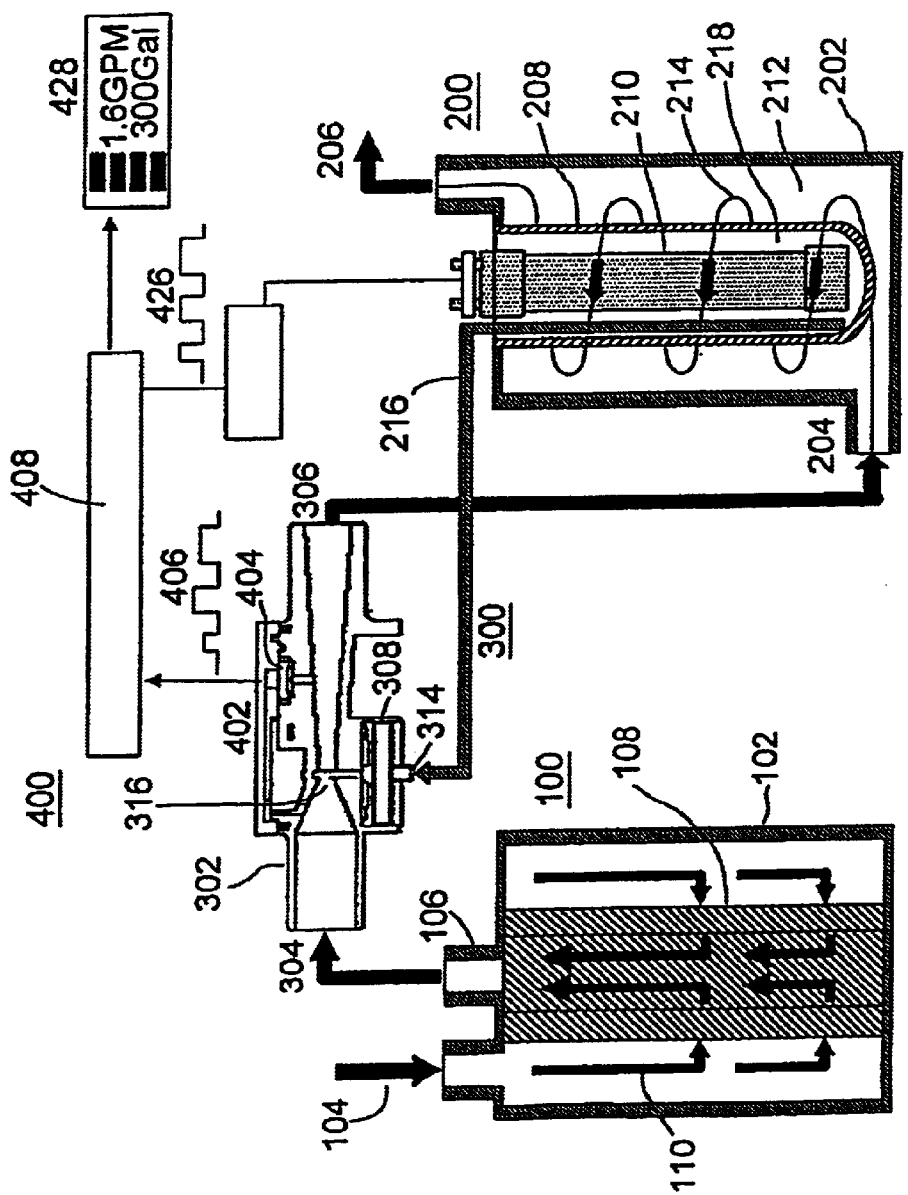
FIG. 1 is a schematic drawing of the overall structure of the water treatment system in accordance with the invention.

As shown in FIG. 1, the water treatment system of the invention includes a filtering apparatus 100, a sterilizing apparatus 200, an ozone gas injection apparatus 300, and a monitoring apparatus 400.

The filtering apparatus 100 includes a filtering tube 102, a water inlet 104, a water outlet 106, and a filter 108. The water to be treated has a certain level of water pressure, which will be injected through the water inlet 104 into the filtering tube 102. Following the directions of the arrow head 110, once the water to be treated passes through the filter 108 to filter out particles, the water is emitted through the water outlet 106. The filter 108 is made of active carbon and polypropylene.

The sterilizing apparatus 200 includes a sterilizing tube 202, a water inlet 204, a water outlet 206, a transparent quartz tube 208, an ultraviolet lamp 210, and an ozone transmission pipe 216. The ozone containing water (to be described later) flows through the water inlet 204 into an accommodation space 212 between the sterilizing tube's 202 transparent quartz tube 208 and the sterilizing tube 202. Utilizing the impact from the water pressure, the ozone gas containing water in the accommodation space 212 between the quartz tube 208 and the sterilizing tube 202 is propelled upward in a spiral like water column 214, circling around the exterior of the quartz tube 208. After the ozone gas containing water is disinfected and flows back into the accommodation space 212, it will encircle the transparent quartz tube and be exposed to the radiation from the ultraviolet lamp 210. This can further kill any remaining bacteria and reduce the amount of excessive ozone gas still existing in the water. The treated water passes out from the water outlet 206 to be used for drinking. In addition, the air in the accommodation space 218 between the ultraviolet lamp 210 and quartz tube 208 is exposed to the light from the ultraviolet lamp 210, producing ozone gas that is emitted from the ozone transmission pipe 216, thereby making the sterilizing apparatus 200 actually an ozone gas producing apparatus.

Figure 2:
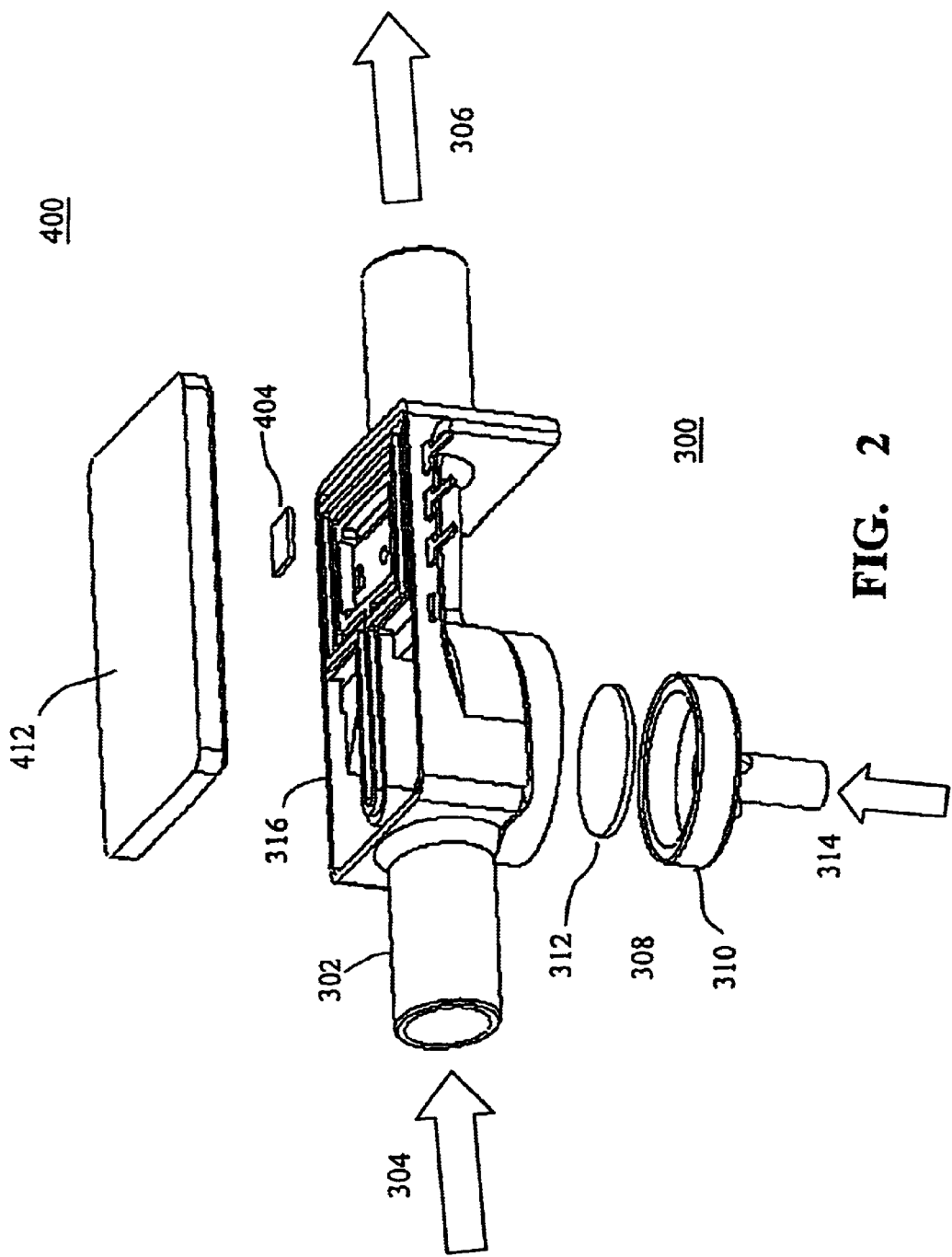
FIG. 2 is an exploded view of ozone gas injection apparatus and monitoring apparatus of the water treatment system in accordance with the invention.
Figure 3:
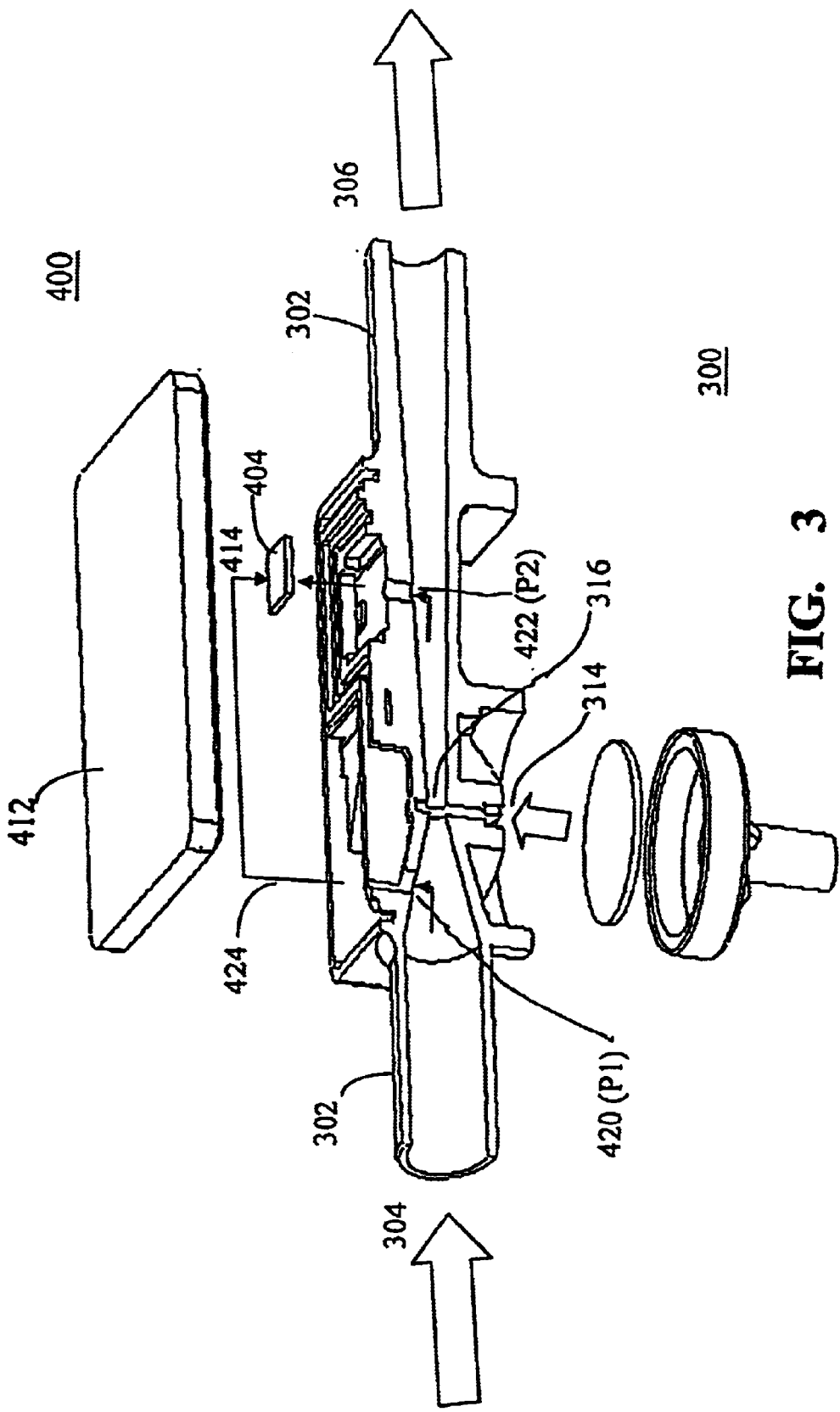
FIG. 3 is a partially exploded view of the ozone gas injection apparatus and the monitoring apparatus of the water treatment system in accordance with the invention.

FIG. 2 is an exploded diagram of the invention's water treatment system's ozone gas injection apparatus and monitoring apparatus while FIG. 3 is a partially exploded diagram of the invention's water treatment system's ozone gas injection apparatus and monitoring apparatus. As shown in FIGS. 1, 2 and 3, the ozone gas injection apparatus 300 includes a main pipe 302 with a water inlet 304 and water outlet 306, a Venturi tube 316 and a check valve 308. This ozone gas injection apparatus 300 is used for absorbing ozone gas as the filtered water flows into the main pipe 302 via the water inlet 304. The entrance of the check valve 308 is the absorbing point for the ozone gas 314. The design of the check valve 308 includes an outer housing 310 and a silicon rubber plate 312. The check valve 308 is a single flow control apparatus, allowing only the ozone gas from the ozone transmission pipe 216 to flow through, but can block the water from flowing back into the ozone transmission pipe 216 via the main pipe 302 and the check valve 308. The Venturi tube 316 substantially consists of a tube with a short, narrow center section and widened, tapered ends. According to Bernoulli's principle, when a solution or gas enters from one end, pressure will increase due to the decrease in the pipe's diameter. The narrow section 503 is where the flow rate increases and the pressure decreases. When water passes through the narrow section 503 back into the larger diameter main pipe 302, the pressure returns, but is still less than the pressure at the entrance end. This allows the ozone gas coming from the sterilizing apparatus 200 to pass through the ozone transmission pipe 216 and the check valve 308, then through the Venturi tube 316 and into the ozone gas injection apparatus 300. Meanwhile, once the water passing through the main pipe 302 is injected with ozone gas, it will go through the water outlet 306 and into the sterilizing apparatus 200. As the water flows out of the main pipe's 302 water outlet and into sterilizing apparatus 200, the water and ozone gas is fully mixed together due to the force and impact of the water pressure.

Referring to FIG. 2, the monitoring apparatus 400 includes a cover 412, a flow meter 402 (see FIG. 1) used for measuring the flow rate and accumulated water flow to calculate the service life of the filter 108 in the filtering apparatus 100, and a pressure sensor 404 used for producing output signals 406 that are transmitted to an electronic board 408, which then generates ultraviolet lamp control signals 426 to monitor the turning on and off of the ultraviolet lamp 210.

The pressure sensor 404 mainly consists of a silicon chip. Both sides of the chip detects the pressure difference between the Venturi tube's water inlet and water outlet ends, then through the relationship between pressure difference and fluid flow velocity, converts the pressure difference into flow rate. Referring to FIG. 3 depicting the invention's flow limiting apparatus, water flows through the path 424 of the pressure sensor 404, the water inlets 420, 422 on both ends of the pressure sensor 404, and the gas (ozone) injection point 314. In the Figure, resistance is created when water passes through the main pipe 302 and hits the narrow section, thereby creating reverse back pressure P1 on one side of the pressure sensor. The water flowing out creates lesser pressure P2 on the other end of the pressure sensor 404. When water has not entered the Venturi tube 316, P1=P2 and the two is equal to roughly one atmosphere pressure. When water begins to flow into the Venturi tube 316, P1>P2, and as the flow rate accelerates, P1 increases, while P2 almost doesn't change. Therefore, the (P1−P2) value grows larger. When flowing water is blocked at the water outlet, then the pressure in the Venturi tube suddenly increases, reaching maximum. After reaching equilibrium, P1=P2. Although the P1 and P2 values are at their maximum, but both values are the same. Therefore, P1−P2=0 with no pressure difference being transmitted outward. This means that the invention can be applied to shut down water coming in from the front end or back end of a water treatment apparatus with the same results. In addition, another advantage of detecting the results of pressure difference is that when this apparatus uses the same water source from other places, its pressure difference will still not be affected and the occurrence of erroneous actions can be avoided.

Figure 4:
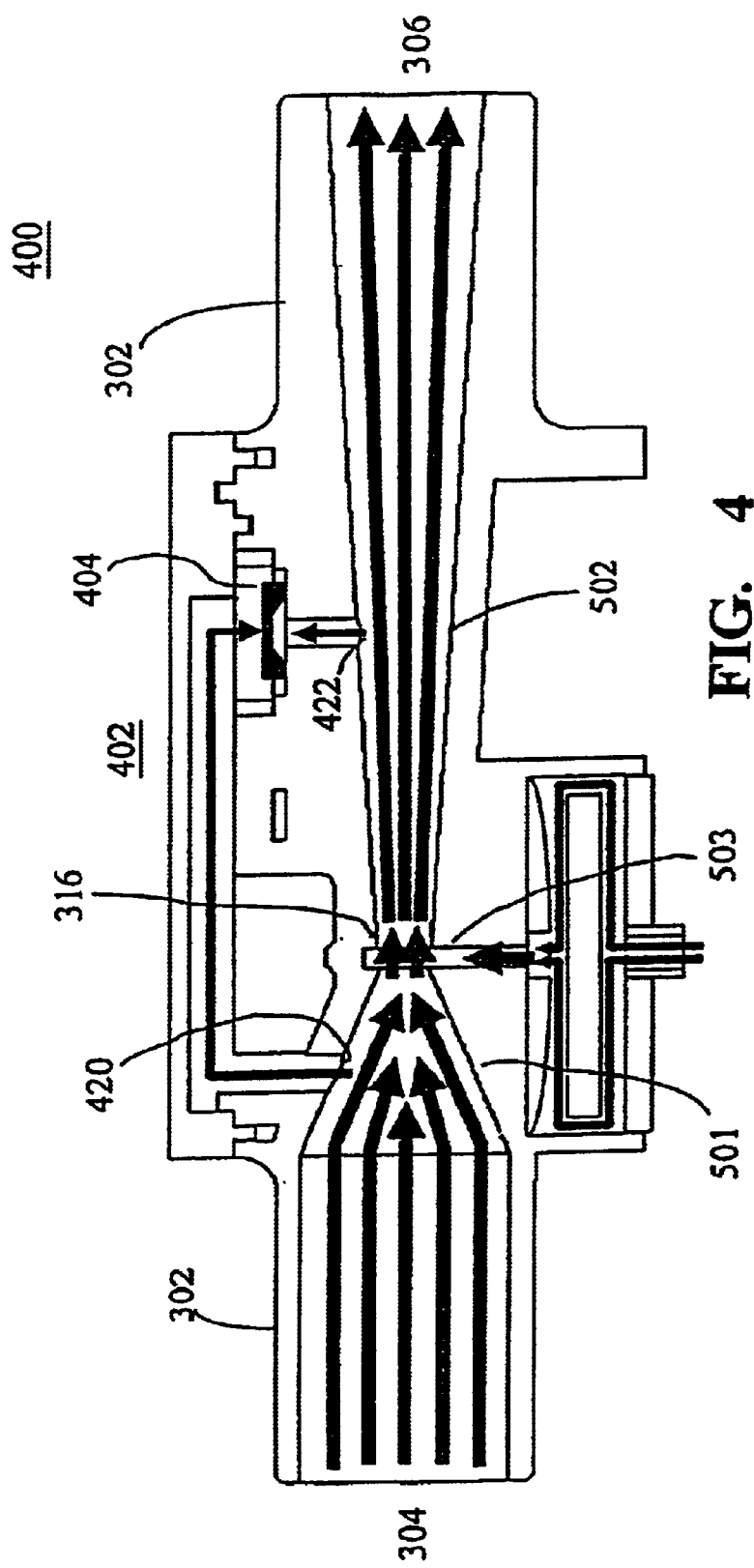
FIG. 4 is a schematic drawing of the monitoring apparatus of the invention where the pressure sensor in the flow meter is provided within the Venturi tube.
Figures 5A, 5B:
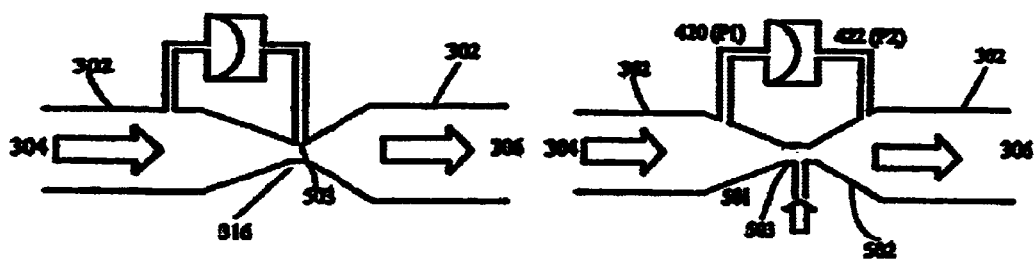
FIG. 5, parts A and B are schematic comparison drawings of the differential pressure type of flow meter A of the prior art and the differential pressure type of flow meter 4 of the invention.
Figure 6:
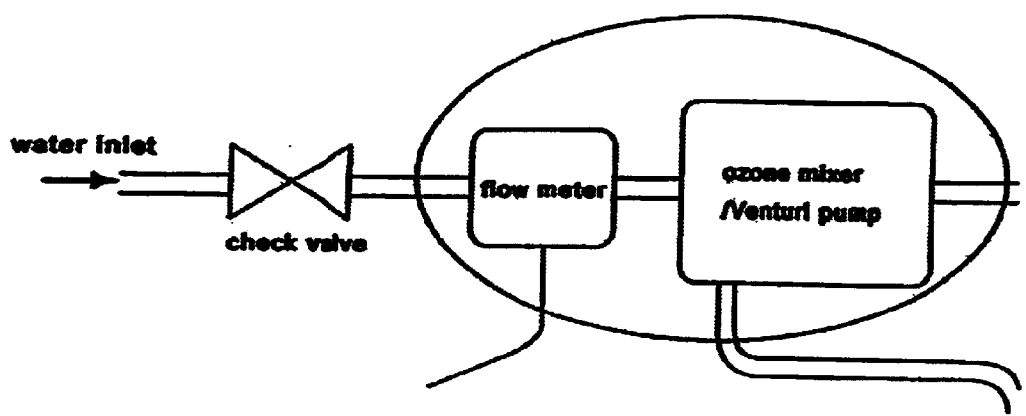
FIG. 6 is a partial diagram of the sterilizing system used in Szabo's U.S. Pat. No. 5,474,748 patent—"Water Disinfecting Device" of the prior art.
Figure 7:
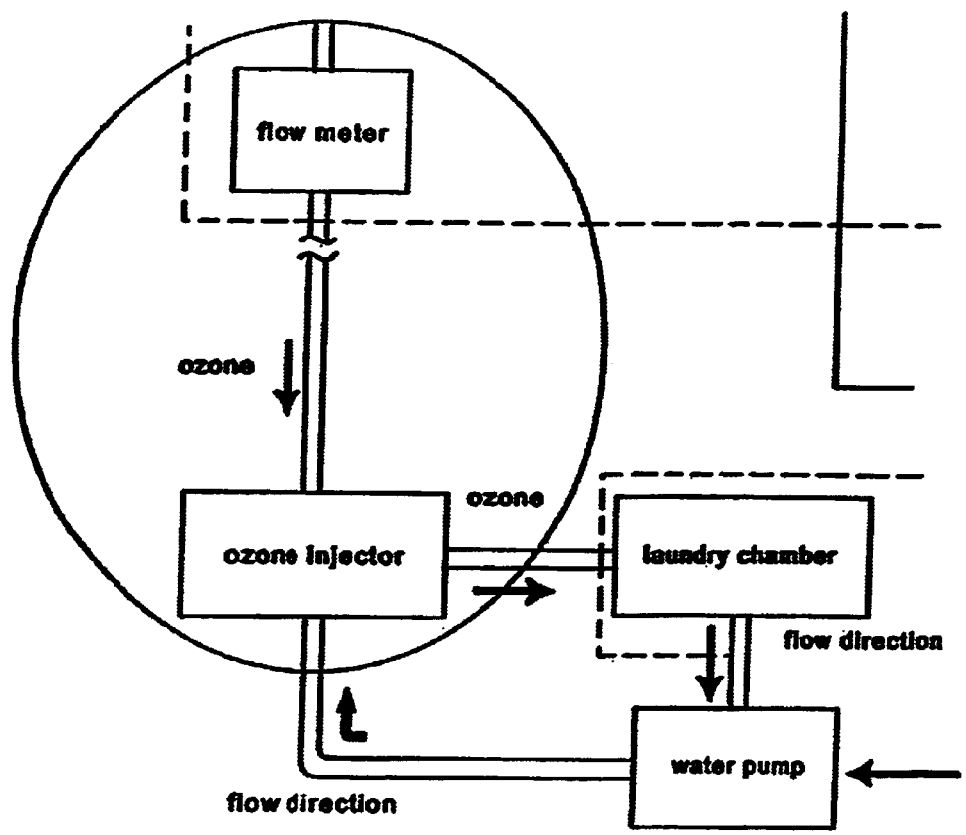
FIG. 7 is a block diagram of the main parts in Radler's U.S. Pat. No. 5,625,915 patent—"Laundry Ozone Injection System" of the prior art.

FIG. 4 is a schematic drawing of the invention's monitoring apparatus 400 where the pressure sensor 404 in the flow meter 402 is placed within the Venturi tube 316. As FIG. 4 depicts, the flow meter 400 of the invention is a pressure difference flow meter. In addition, the special design shown in FIG. 4 or Part B of FIG. 5 is another feature of the invention.

As shown in FIG. 3, in order to effectively save space, the invention directly places the pressure sensor 404 into the main pipe 302, thereby leading the water of the water inlet 420 to one end 414 of the pressure sensor 404. Meanwhile, the water flows from another water inlet 422 to upwardly apply pressure. The output signals 406 of the sensor (see FIG. 1) are transmitted through pins embedded within the Venturi tube (not shown), The flow meter 402 is probably the smallest digital flow meter on the market today. Its volume is 15×15×25 mm. The pressure sensor of the invention can be a single pressure sensor directly detecting pressure on both sides from the difference in pressure, or using two pressure sensors to separately detect the pressure difference on both ends of the Venturi tube. Through the pressure sensor's instant conversion into flow rate; the accumulated water flow as well as the filter's remaining service life can be shown on an LCD panel 428 (see FIG. 1). In addition, As shown in FIG. 1, after water passes through the sterilizing apparatus' 200 water inlet 204 again, it will run by the ultraviolet lamp 210 and be sterilized by the lamp's ultraviolet light then emitted out from the other water outlet 206. The switch on the ultraviolet lamp 210 (not shown in Figure) is controlled by the flow rate. The lamp is turned on when the flow rate exceeds a preset value. Laboratory proof shows that through a specially designed high speed lamp actuator, 3 seconds after the lamp is turned on, it can attain more than 80% of power, approximately more than 10,000 $\mu W/cm^2$. Another practical advantage of the invention lies in that the system is notified that the water treatment apparatus is in use when the flow rate reaches the upper limit of its preset flow rate value. Meanwhile, the system will sound a warning signal when it reaches the preset total water volume for its filter's service life, reminding the user to change and replace a new filter. When not in use, the flow rate will fall below its preset lower limit, thus cutting off the power and turning off the buzzer alarm. This can prevent the buzzer alarm from going off at unnecessary hours, creating problems for the user.

There are no special material requirements for the invention, as long as it meets the requirements of the environment. PVDF is recommended as the main type of material for the ozone gas and water mixing apparatus, while silicon rubber plate can be used for the monitoring piece inside the check valve. The pressure sensor is made of a silicon chip. One side of the silicon chip is in direct contact with the water inside the pipes while the other side is covered with a silicon gel after wire bonding, and then the silicon gel is in direct contact with the water.

Regarding one of the applications emphasized by the invention, the invention can attain the object of disinfection by injecting ozone gas or through the combination of ozone gas plus ultraviolet light generated by the ultraviolet lamp, thereby achieving dual mode disinfection objective. When ozone gas is absorbed into both ends of the Venturi tube, the pressure difference between there used to monitor the flow rate and total water volume is an important source for monitoring the service life of the filtering material (e.g. disinfecting material such as active carbon, polypropylene, etc.). Advantages after the improvements include:
1. Space-saving;
2. Cost-reducing;
3. No significant changes to the water outflow;
4. The total treated water volume can be used as a basis for assessing the filter's service life, making it more accurate than using elapsed time as the basis for assessing the filter's service life; and
5. To assess whether or not the filter is clogged based on the flow rate, especially for ceramic filtering material, which can act as the basis for assessing if the service life has been reached.

When measuring the flow rate, at the same time it can compare it with the minimum preset water outflow velocity so that when the flow rate exceeds the preset value, it will know that the water treatment facility is being used and can therefore act as a on/off function. Once it has this switch, this facility can simultaneously turn on the ultraviolet lamp to disinfect, instead of having to be in active state round the clock. The advantages after these improvements include:
1. To save electricity;
2. To extend the service life of the ultraviolet lamp;
3. To prevent the area around the lamp from overheating and thereby reducing the amount of ozone gas generated; and
4. To prevent the water going out becoming too hot, creating rejection by the user.

In addition, another practical advantage of the invention is that it uses flow rate and total water volume to set the service life of the filter and a buzzer alarm to remind the user to change and replace the filter. Through signals from the flow rate, power is cut off when not in use. Therefore although the total water volume may have already reached the set amount for the filter's service life, yet the buzzer alarm will not go off. The power will be turned back on only when the flow rate signal is in use and the buzzer alarm will go off when the total water volume has reached the set amount for the filter's service life. This way, it can prevent the alarm from going off at unnecessary hours, causing problems for the user.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A water treatment system combining ozone gas injection apparatus and monitoring apparatus, in which a filtering apparatus and a sterilizing apparatus generating ozone gas and having an ultraviolet lamp are included, comprising:

an ozone gas injection apparatus having a main water pipe with a water inlet and a water outlet, a Venturi tube having an ozone injection point, and a check valve, wherein said ozone gas injection apparatus is used for absorbing ozone gas as the filtered water flows into said main pipe via said water inlet, whereupon the water then passes through said Venturi tube to generate a relatively low pressure so as to absorb the ozone generated from said sterilizing apparatus and transmitted through an ozone transmission pipe, and wherein said check valve, which allows the ozone to flow through and then being absorbed into said main water pipe, can block the water from flowing out of said main water pipe into said ozone transmission pipe so that the ozone-absorbed water flowing out of said main water pipe via said water outlet, after being squeezed and impacted, is mixed with ozone thoroughly and flows into said sterilizing apparatus; and a monitoring apparatus including (i) a flow path having first and second path inlets respectively communicating with said water inlet upstream of said ozone injection point and said water outlet downstream of said ozone injection point; (ii) a flow meter adapted to measure flow rate and accumulated water flow to calculate the service life of filtering material of said filtering apparatus; and (iii) said flow meter including a pressure sensor positioned within said flow path and adapted to generate output signals to control the switch of said ultraviolet lamp.

2. The water treatment system combining ozone gas injection apparatus and monitoring apparatus as claimed in 1, wherein said flow meter in said monitoring apparatus utilizes the pressure difference between said path inlets and is configured as a component of the ozone gas injection apparatus.

3. The water treatment system combining ozone gas injection apparatus and monitoring apparatus as claimed in claim 1, wherein said output signals generated by said pressure sensor are adapted to control said switch of said ultraviolet lamp so that said ultraviolet lamp can be turned off when the water treatment system is not in use, thereby saving power and extending service life of the ultraviolet lamp.

4. The water treatment system combining ozone gas injection apparatus and monitoring apparatus as claimed in claim 1, wherein said pressure sensor in said monitoring apparatus is made of a silicon chip, and wherein a side of which is in direct contact with the water from said main pipe, while the other side is covered with a layer of silicon gel after being connected to a wire bonding, and wherein the layer of silicon gel then is in direct contact with the water.

5. The water treatment system combining ozone gas injection apparatus and monitoring apparatus as claimed in claim 1, wherein within said water treatment system is installed a buzzer that will give an alarm sound once the flow meter of said monitoring apparatus reaches its preset accumulated water flow, signaling that said filtering material has reached its expected service life and reminding the user to change said filtering material.

6. A water treatment system combining ozone gas injection apparatus and monitoring apparatus, comprising:

a filtering apparatus used to filter and emit the water that needs to be treated;

a sterilizing apparatus having an ultraviolet lamp, a transparent quartz pipe, an ozone transmission pipe, a non-transparent spiral water transmission pipe, and a sterilizing tube, wherein said ultraviolet lamp shines on the air contained in the quartz pipe, creating ozone gas and emitting it through said ozone transmission pipe, and wherein said non-transparent spiral water transmission pipe fully mixes the transmitted ozone gas containing water while the stored air flowing through the sterilizing tube is exposed to the ultraviolet lamp through said transparent quartz pipe, thereby killing bacteria and reducing the amount of ozone gas in the water flowing out to be drunk;

an ozone gas injection apparatus having a main water pipe with a water inlet and a water outlet, a Venturi tube having an ozone injection point, and a check valve, wherein said ozone gas injection apparatus is used for absorbing ozone gas as the filtered water flows into said main pipe via said water inlet, and the water then passes through said Venturi tube to generate a relatively low pressure so as to absorb the ozone generated from said sterilizing apparatus and transmitted through an ozone transmission pipe, and wherein said check valve, which allows the ozone to flow through and then being absorbed into said main water pipe, can block the water from flowing out of said main water pipe into said ozone transmission pipe so that the ozone-absorbed water flowing out of said main water pipe via said water outlet, after being squeezed and impacted, is mixed with ozone thoroughly and flows into said sterilizing apparatus; and a monitoring apparatus including (i) a flow path having first and second path inlets respectively communicating with said water inlet upstream of said ozone injection point and said water outlet downstream of said ozone injection point; (ii) a flow meter adapted to measure flow rate and accumulated water flow to calculate the service life of filtering material of said filtering apparatus; and (iii) said flow meter including a pressure sensor positioned within said flow path and adapted to generate output signals to control the switch of said ultraviolet lamp.

7. The water treatment system combining ozone gas injection apparatus and monitoring apparatus as claimed in claim 6, wherein said flow meter in said monitoring apparatus utilizes the pressure difference between said path inlets and is configured as a component of the ozone gas injection apparatus.

8. The water treatment system combining ozone gas injection apparatus and monitoring apparatus as claimed in claim 6, wherein said output signals generated by said pressure sensor are adapted to control said switch of said ultraviolet lamp so that said ultraviolet lamp can be turned off when the water treatment system is not in use, thereby saving power and extending service life of the ultraviolet lamp.

9. The water treatment system combining ozone gas injection apparatus and monitoring apparatus as claimed in claim 6, wherein said pressure sensor in said monitoring apparatus is made of a silicon chip, and wherein one side is in direct contact with the water from said main pipe, while the other side is covered with a layer of silicon gel after being connected to a wire bonding, and wherein the layer of silicon gel is then in direct contact with the water.

10. The water treatment system combining ozone gas injection apparatus and monitoring apparatus as claimed in claim 6, wherein a buzzer is installed within said water treatment system and the buzzer can give an alarm sound once said flow meter of said monitoring apparatus reaches its preset accumulated amount of water flow, signaling that said filtering material has reached its expected service life and reminding the user to change said filtering material.

* * * * *